United States Patent [19]

Anderson

[11] Patent Number: 4,609,133
[45] Date of Patent: Sep. 2, 1986

[54] COLLAPSIBLE CAR TOP SIGN CARRIER

[76] Inventor: Rickie W. Anderson, 2453 Garapan, Houston, Tex. 77091

[21] Appl. No.: 766,576

[22] Filed: Aug. 19, 1985

[51] Int. Cl.[4] .......................... B60R 9/00; G09F 21/04
[52] U.S. Cl. ...................................... 224/317; 40/592; 224/329
[58] Field of Search ............... 224/309, 317, 329, 273; 40/592

[56] References Cited

U.S. PATENT DOCUMENTS

| | | | |
|---|---|---|---|
| 823,459 | 6/1906 | Batchelder | 40/592 |
| 3,153,294 | 10/1964 | Hay et al. | 224/329 X |
| 3,225,475 | 12/1965 | Shank | 224/329 X |
| 3,392,467 | 7/1968 | Hawes | 40/592 |
| 3,493,203 | 2/1970 | Gualano | 224/317 X |
| 3,525,461 | 8/1970 | Bronson | 40/592 X |
| 3,779,436 | 12/1973 | Burland | 224/317 |
| 4,574,726 | 3/1986 | Sullivan | 40/592 X |

*Primary Examiner*—Stephen Marcus
*Assistant Examiner*—Robert Petrik
*Attorney, Agent, or Firm*—Michael P. Breston

[57] ABSTRACT

The sign carrier structure includes a frame forming a space adapted to accept a sign therein. A pair of legs extend downwardly from the opposite sides of the frame. An inverted U-shaped bracket is coupled to the top edge of a car window. In use, the bracket is sandwiched between the window and the socket for the window. One leg is coupled to the bracket, and the other leg rests on the top of a vehicle, thereby displaying the sign through the space.

3 Claims, 4 Drawing Figures

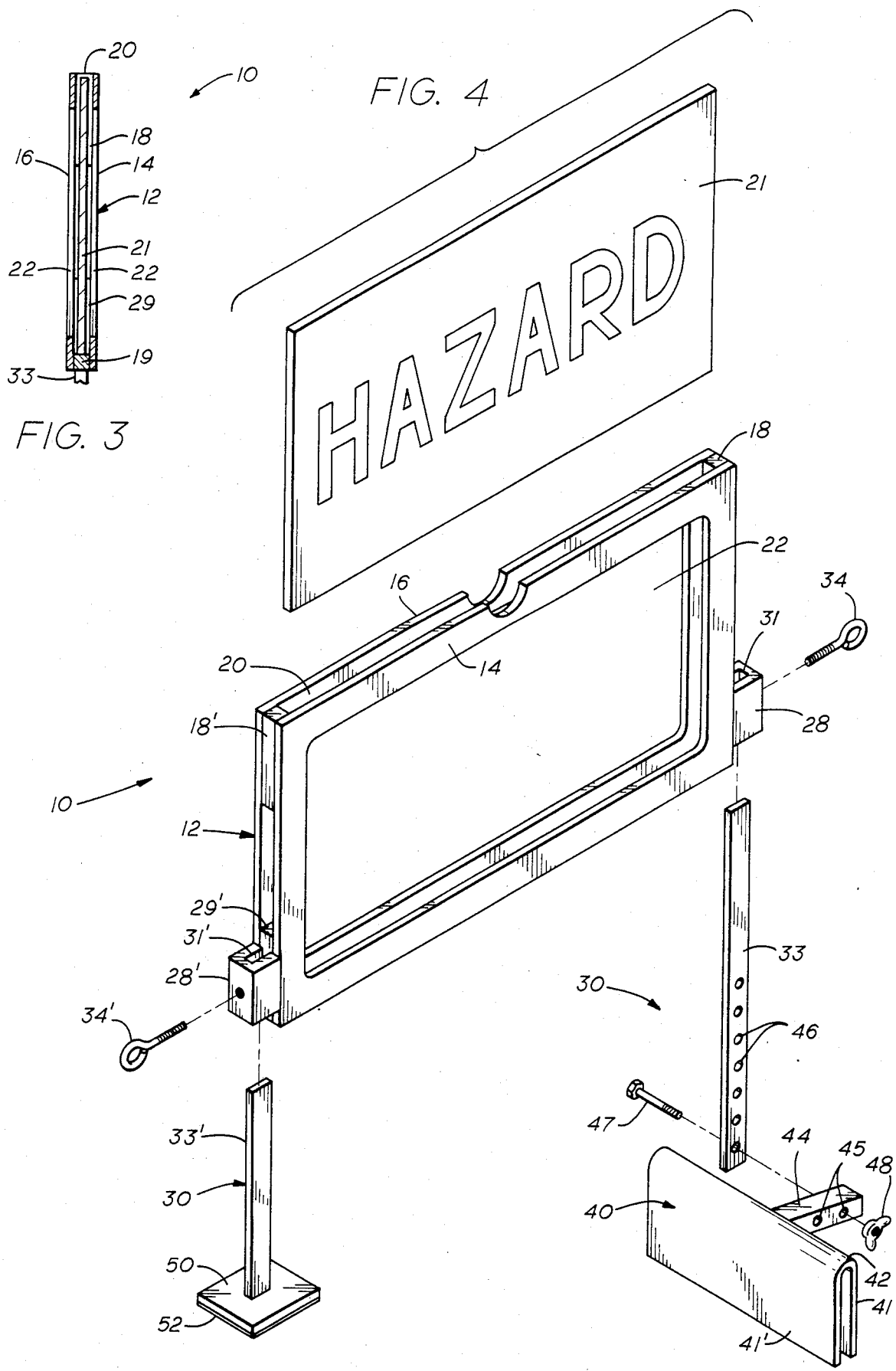

COLLAPSIBLE CAR TOP SIGN CARRIER

BACKGROUND OF THE INVENTION

1. Field of the Invention

This invention relates to car top sign carriers and especially to such sign carriers which are easily collapsible and which can be mounted without tools.

2. Brief Description of the Prior Art

Vehicle top sign carriers are widely used for carrying a wide variety of signs ranging from advertising to emergency signs. Many patents have already issued on such car top sign carriers. But the known such sign holders are relatively heavy and require time and skill for mounting them over the car top. Especially in an emergency, it is desired to erect such a sign as quickly as possible.

I have departed from such conventional structures and have provided a light-weight, easily-collapsible, vehicle top sign carrier, which is quickly and easily erectable, which is partly supported on the window of the vehicle, and which has particular utility to drivers in distress, as when the vehicle has a flat tire, battery failure, passenger sickness, or other such emergency.

SUMMARY OF THE INVENTION

The invention provides a top frame which is easily adapted to serve as a car top sign carrier. The frame can accept different signs securely and conveniently and is collapsible into a small space when not in use. A first leg and a second leg extend downwardly from the opposite sides of the frame. Coupling means detachably secure the legs to the frame. An inverted U-shaped bracket is adapted to become coupled to the top edge of a car window. In use, the bracket is sandwiched between the window and the window socket. The first leg, in use, is mounted on the bracket. A pedestal supports the second leg on top of the car.

BRIEF DESCRIPTION OF THE DRAWINGS

FIG. 3 is a sectional view of the frame of the carrier taken on line 3—3 in FIG. 2; and FIG. 4 is an exploded view in perspective of the sign carrier structure shown in FIG. 2.

DESCRIPTION OF THE PREFERRED EMBODIMENT

Figure 1:
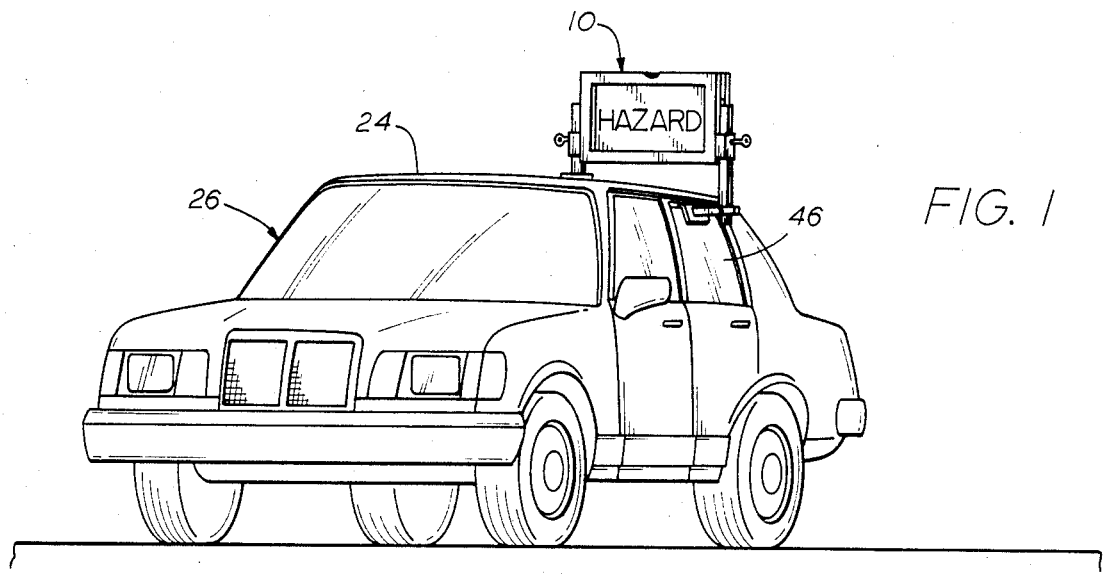
FIG. 1 is a left front view in perspective of one embodiment of the sign carrier shown mounted between the rear car window and car top.
Figure 2:
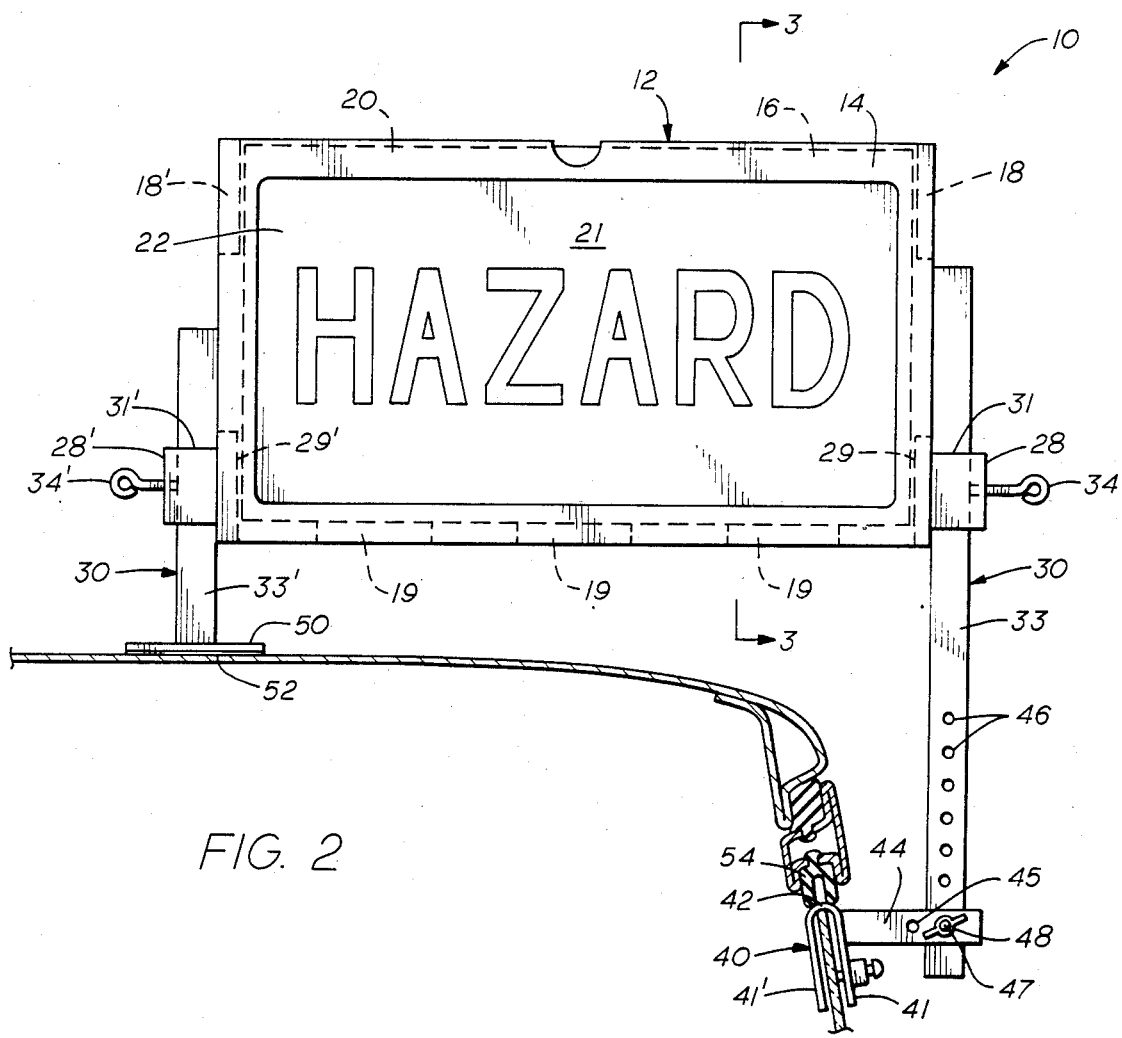
FIG. 2 is an enlarged front view of the sign carrier shown in FIG. 1.

In FIGS. 1-4, like reference numerals designate the same parts, and similar parts are sometimes designated with a prime (').

In a simplified embodiment, the sign carrier structure, generally designated as 10, comprises a frame 12 having a front panel 14, a rear panel 16, side spacers 18, 18', and bottom sign retainers 19, all forming therebetween a sign-holding socket 20 and a rectangular space 22.

Frame 12 can be made from a strong, durable, light-weight, plastic or metallic material. A suitable sign 21, such as a "HAZARD" sign, is removably and snugly accepted in socket 20 to be displayed through space 22.

A pair of rectangular sleeves 28, 28' are mounted on block retainers 29, 29' which are fixedly mounted between side edges 18, 18' of front and rear panels 14 and 16. Sleeves 28, 28' extend outwardly in opposite directions and respectively have rectangular axial bores 31, 31' therethrough.

Frame 12 is adapted to be erected above the top 24 of a vehicle, such as a car 26. For this purpose, frame 12 is supported by a frame mount, generally designated as 30, which includes a pair of rectangular legs 33, 33' and supports therefor.

Bores 31, 31', respectively, slidably accept therethrough legs 33, 33' which are removably fastened to frame 12 by friction bolts 34, 34'.

The support for leg 33 is provided by an inverted U-shaped bracket 40 having a pair of legs 41, 41' and a base 42. A stiff shoulder 44 laterally and outwardly extends from leg 41 of bracket 40 and has one or more transverse holes 45.

Bracket 40 is easily mountable on the car's window 46 which is then fully rolled up so that base 42 of bracket 40 is securely sandwiched between the edge of window 46 and its socket 54.

Leg 33' rests on the car's top 24 and for that purpose a contoured pedestal 50 is connected to the bottom of leg 33' and preferably includes a magnet 52 for metallic car tops.

A plurality of longitudinally-spaced holes 46 in leg 33 allow a bolt 47 and a wing nut 48 to adjustably secure leg 33 to shoulder 44. Leg 33 can thus be raised or lowered, as required.

Different signs can be readily inserted into socket 20, and structure 10 is designed depending on the constraints desired to be imposed on the movements of the articulations and to limit the twisting of structure 10 from the normally erect position shown in FIG. 1.

It will be readily apparent that the twisting and/or turning of frame 12 in any direction will be limited by the combined restraining actions of the walls of U-shaped bracket 40, the stiffness of leg 33, and magnet 52.

The sign carrier structure of this invention will find a variety of applications by advertisers of sports events, taxi drivers, truck drivers, car drivers, etc.

Moreover, while the invention was illustrated for use with a car, it is not limited thereto. In general, it can be applied to any vehicle which has a movable window with proper modifications for the geometry of the vehicle.

What I claim is:

1. A sign carrier structure adapted to become erected on the top of a car and when not in use to become collapsed into a small space, said structure including:

a frame, which in use extends transversely of said top, for removably accepting a sign therein;

a mount for supporting said frame, said mount including a bracket, a first leg and a second leg, both legs extending downwardly from the opposite sides of said frame;

said bracket being U-shaped and having a base and a pair of downwardly-extending parallel plates, said base being mountable on the top edge of the car's window which, when fully rolled up, securely sandwiches the base between the window and the window's socket; and a stiff shoulder laterally and outwardly extending from said bracket, said first leg being securely and removably mounted on said shoulder, and said second leg resting on said top, whereby twisting of said frame is limited by the combined restraining actions of said plates and of said shoulder.

2. The structure of claim 1, wherein each leg has a rectangular cross section;
a sleeve outwardly extending from each side of said frame, and each sleeve having a rectangular recess;
each leg extending through a corresponding recess in one of said sleeves; and
an adjustable bolt for securing each leg to its sleeve.

3. The structure of claim 2, wherein said shoulder has one or more laterally-spaced transverse holes;
means for adjustably bolting said first leg to said shoulder through one of said holes; and
a support for maintaining said second leg on said top without securing said support to said top.

* * * * *